United States Patent [19]

Kotani et al.

[11] Patent Number: 5,256,473

[45] Date of Patent: Oct. 26, 1993

[54] INFRARED ABSORBING FILM IMPROVED IN TRANSPARENCY

[75] Inventors: Kozo Kotani, Toyonaka; Hideo Negawa, Shiga, both of Japan

[73] Assignee: Sumitomo Chemical Company, Limited, Osaka, Japan

[21] Appl. No.: 764,195

[22] Filed: Sep. 23, 1991

[30] Foreign Application Priority Data

Oct. 3, 1990 [JP] Japan ................... 2-267300

[51] Int. Cl.$^5$ .............................................. A01G 9/20
[52] U.S. Cl. ..................................... 428/218; 241/21;
428/220; 428/331; 428/334; 428/516; 428/518;
428/520; 428/522; 428/523
[58] Field of Search ............... 428/331, 218, 220, 334,
428/516, 518, 520, 522, 523; 241/21

[56] References Cited

U.S. PATENT DOCUMENTS

| | | | |
|---|---|---|---|
| 4,075,784 | 2/1978 | Pied | 47/9 |
| 4,478,909 | 10/1984 | Taniguchi et al. | 428/331 |
| 4,481,254 | 11/1984 | Fukushima et al. | 428/331 |
| 4,490,502 | 12/1984 | Fukushima et al. | 524/445 |
| 4,518,654 | 5/1985 | Eichbauer et al. | 428/331 |
| 4,542,061 | 9/1985 | Fukushima et al. | 428/220 |
| 4,840,823 | 6/1989 | Chigami et al. | 428/331 |
| 5,075,146 | 12/1991 | Satake et al. | 428/64 |

FOREIGN PATENT DOCUMENTS

| | | |
|---|---|---|
| 0030288 | 11/1980 | European Pat. Off. |
| 0257611 | 8/1987 | European Pat. Off. |
| 2013853 | 1/1972 | Japan |
| 47-13853 | 4/1972 | Japan |
| 2005825 | 2/1982 | Japan |
| 4050251 | 12/1984 | Japan |
| 8013832 | 3/1988 | Japan |

OTHER PUBLICATIONS

Database WPIL, Derwent Publicataions Ltd., London, GB; AN 86-065629 & JP-A-61 017 415, Jan. 1986.

*Primary Examiner*—Paul J. Thibodeau
*Assistant Examiner*—D. S. Nakarani
*Attorney, Agent, or Firm*—Birch, Stewart, Kolasch & Birch

[57] ABSTRACT

Disclosed is an infrared absorbing film comprising a synthetic resin and silicon oxide, wherein the silicon oxide is used in an amount of about 2 to about 25% by weight based on the synthetic resin, and wherein the silicon oxide is produced by underwater grinding, has an average particle size of not more than 4 μm, is substantially free of particles exceeding 20 μm in average particle size, and has a specific surface area of not more than 20 m²/g.

The film may further comprise a transparent resin layer formed over at least one surface thereof.

22 Claims, 1 Drawing Sheet

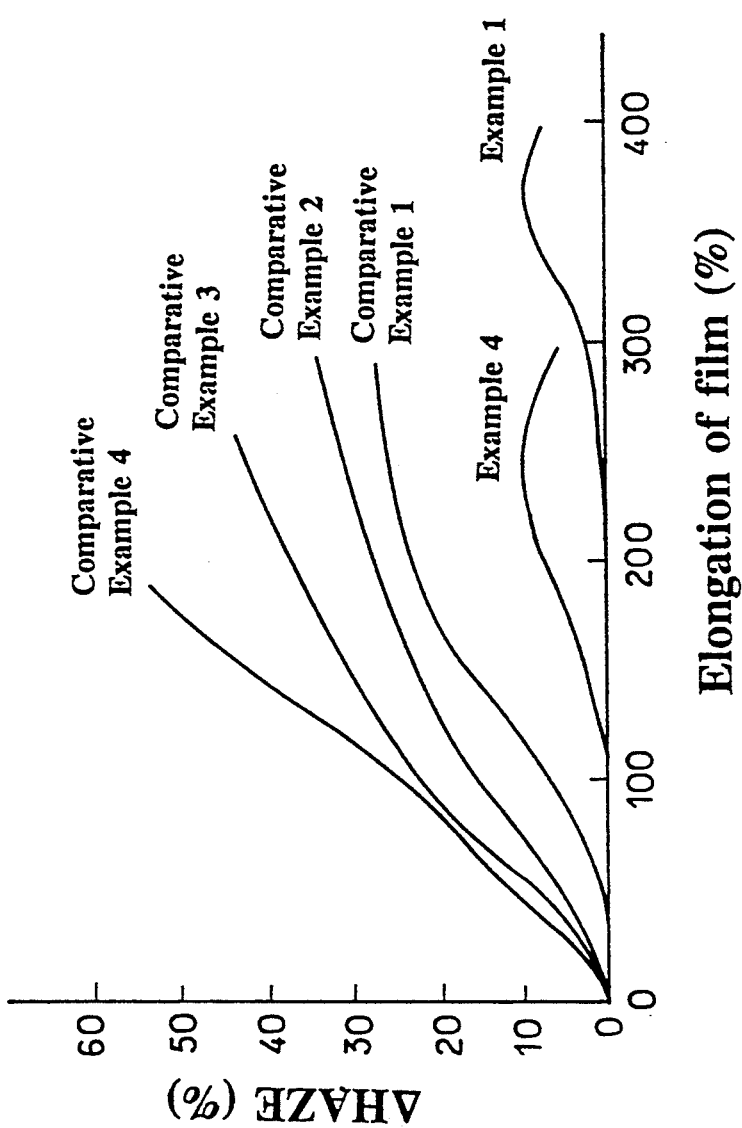

INFRARED ABSORBING FILM IMPROVED IN TRANSPARENCY

BACKGROUND OF THE INVENTION

1. Field of the Invention

The present invention relates to an infrared radiation absorbing film having good transparency and suited for use, among others, as a packaging material for perishable foods and as a covering material for green house.

2. Prior Art

For packaging foods and for covering protected horticultural houses, there have been mainly used polyethylene films, ethylene-vinyl acetate copolymer films, polypropylene films, polyvinyl chloride films and the like. The technology of providing these films with an infrared radiation absorbing property has been widely employed for improving the ripening behavior, preservability, taste and flavor of foods, for instance, in the field of packaging perishable foods and for improving the nighttime heat-retaining capacity of green house coverings.

While some synthetic resins used for preparing films, such as polyvinyl chloride resins and polyethylene terephthalate resins, themselves have good infrared radiation absorbing ability, other resins such as polyethylene and polypropylene resins are low in infrared radiation absorbing ability. For providing synthetic resins with higher infrared absorbing ability, a number of methods are known which comprise incorporating a certain specific inorganic compound into a synthetic resin to thereby make use of the ionic lattice vibration of such inorganic compounds upon exposure to infrared radiation.

Thus, for instance, Japanese Examined Patent Publication (Kokoku) No. 13853/1972 discloses a film for agricultural use which is excellent in transparency and heat retention and which is prepared by incorporating 1 to 10% by weight of silicon oxide into a polyethylene or an ethylene-vinyl acetate copolymer. Japanese Examined Patent Publication No. 5825/1982 discloses a film for agricultural use which is similar to that mentioned above and which is composed of a polyethylene or an ethylene-vinyl acetate copolymer containing an anhydrous aluminosilicate salt in an amount of 1 to 20% by weight.

However, while such synthetic resin films containing each of these inorganic compounds indeed have infrared absorbing ability, there is a problem that their transparency to visible light is impaired.

To solve such a problem, attempts have been made for example, to produce films having good transparency by adjusting the refractive index of an inorganic compound having infrared absorbing ability to the refractive index of the synthetic resin (Japanese Examined Patent Publication No. 50251/1984, Japanese Examined Patent Publication No. 5183/1984, etc.) or to add silicon oxide having a specified particle size to thereby prevent transparency decrease due to the formation of the so-called hard spots or granular structure as otherwise resulting from aggregation of silicon oxide particles (Japanese Examined Patent Publication No. 13832/1988).

The object, which is to solve the above problem, can be achieved to some extent by adding a specific inorganic compound to synthetic resins to thereby provide them with infrared absorbing ability while controlling the refractive index of said inorganic compound or using a specific particle size grade of said inorganic compound to thereby obtain highly transparent films. However, the effects are not yet satisfactory. Particularly when silicon oxide, which has high infrared absorbing ability, is added to synthetic resins and when said silicon oxide is very finely divided and has an average particle size of 4 μm or less, the fine particles tend to aggregate. When films are produced, the aggregates readily cause formation of hard spots of tens of micrometers to several hundred micrometers in size in the films, impairing the transparency and appearance of the films produced. Interestingly, it has already been found that when a silicon oxide species having a larger average particle size is used, the above-mentioned hard spots formation rather less frequently takes place.

However, silicon oxide species having a larger particle size, although less likely to form hard spots, are disadvantageous in that the scattering of visible light is increased at the film surface and within the film with the result that the film transparency is decreased.

Furthermore, most synthetic resin films containing an inorganic compound as an additive have a further problem; namely, when they are stretched even if only a little, the stretched portions tend to become white and opaque.

This whitening phenomenon on stretching may be regarded as an indication of inferior quality in some instances in the field of packaging films or films for agricultural use.

SUMMARY OF THE INVENTION

The present invention have made intensive investigations to create an infrared absorbing film which has good transparency and good resistance to whitening on stretching and which is substantially free of hard spots. As a result, the present inventors have found that the object mentioned above can be accomplished when a silicon oxide species having specific powder characteristics as obtained by underwater grinding is added to the synthetic resins. This finding has now led to the completion of the present invention.

The invention thus provides an infrared absorbing film having improved transparency comprising a synthetic resin and silicon oxide, wherein the silicon oxide is used in an amount of about 2 to about 25% by weight based on the synthetic resin, and wherein the silicon oxide is produced by underwater grinding, has an average particle size of not more than 4 μm, is substantially free of particles exceeding 20 μm in particle size, and has a specific surface area of not more than 20 $m^2/g$.

DETAILED DESCRIPTION OF THE INVENTION

As the synthetic resin to be used in the invention, there may be mentioned a variety of olefin resins such as olefin polymers, copolymers of two or more olefins, and copolymers of at least one olefin, which serves as the main component, and one or more other monomers, and there is no particular restriction on the type of resins insofar as they can be formed into a transparent film. More specifically, said resin includes, among others, polyethylenes such as low-density polyethylene, medium-density polyethylene and high-density polyethylene, copolymers of ethylene and α-olefin such as butene-1, 4-methylpentene-1, hexene-1 or octene-1 (L-LDPE), ethylene-vinyl acetate copolymers, ethylene-acrylic acid copolymers, ethylene-alkyl (meth)acrylate copolymers, ionomer resins, polypropylenes, ethylene-propylene copolymers, propylene-butene-1 copolymers, and polyvinyl chloride resins. It is preferable to use olefin resins having a melt flow rate (MFR) of about 0.1 to about 4 g/10 minutes. The polyvinyl chloride resins are plasticized with at least one or more plasticizers which are known and conventionally used in the art. Examples of such plasticizers are phthalic acid esters such as dioctyl phthalate and di-(2-ethylhexyl) phthalate, phosphoric acid esters such as tricresyl phosphate or trioctylphosphate, di-n-butyl adipate, di-n-butyl maleate, epoxidized soybean oil, epoxidized polybutadiene and the like. The plasticizers are used in an amount of about 20 to about 100 parts by weight per 100 parts by weight of polyvinyl chloride. Preferably the polyvinyl chloride has a polymerization degree of about 800 to about 2500. Among these resins, low-density polyethylene or ethylene-$\alpha$-olefin copolymers, each having a density of 0.935 g/cm$^3$ or less, particularly 0.910 to 0.935 g/cm$^3$, ethylene-vinyl acetate copolymers having a vinyl acetate content of not more than about 30% by weight, particularly about 5 to 25% by weight, and polyvinyl chloride resins are preferred from the viewpoint of transparency, weather resistance, flexibility and cost.

The silicon oxide to be used in accordance with the invention is produced by underwater grinding or milling. It has an average particle size of not more than 4 $\mu$m, particularly 1 to 4 $\mu$m, is substantially free of particles exceeding 20 $\mu$m in particle size, and has a specific surface area of not more than 20 m$^2$/g, particularly 5 to 20 m$^2$/g. Preferably, it should have an average particle size of not more than 3 $\mu$m, particularly 1 to 3 $\mu$m, be substantially free of particles exceeding 10 $\mu$m in particle size, and have a specific surface area of not more than 15 m$^2$/g, particularly 5 to 15 m$^2$/g. The silicon oxide to be used in the invention may be derived from a natural product or a synthetic product. It is important, however, that it should be produced by underwater grinding, for example by charging an appropriate grinding apparatus such as a ball mill with silicon oxide together with water and causing friction among silicon oxide grains or particles or by using balls as auxiliary means in the above process. It is also possible to prepare said silicon oxide particles by subjecting silicon oxide already pulverized by dry method such as a dry mechanical grinding method to underwater grinding as mentioned above. There is not a specific restriction on the method of producing the silicon oxide particles having the above specified powder characteristics. However, such powders are preferably prepared as follows. First, a raw material silicon oxide lumps are coarsely ground if so desired to an appropriate lump size of, for example, about 30 to about 100 mm, and the coarsely ground silicon oxide and water is placed in a grinding or milling apparatus such as a ball mill, which is then operated in a conventional manner until a major portion of the ground silicon oxide will possess the above-specified powder characteristics. When a ball mill with a capacity of 4 tons per batch is used, the time that is usually required for such grinding in water ranges from about 20 to about 100 hours. The silicon oxide particle slurry thus obtained is dewatered and dried in a conventional manner, and then the dry particles are classified with use of a conventional powder separator, whereby the desired silicon oxide particles having the above-specified powder characteristics are obtained. The above method will be further illustrated in greater detail in Reference Example 1 to be described below.

Silicon oxide particles produced by a dry method, when incorporated into synthetic resins for producing films, show poor dispersibility and, in particular, cause significant whitening of films upon stretching.

It is essential that the silicon oxide to be used in accordance with the invention should not only be produced by underwater grinding but also have an average particle size of not more than 4 $\mu$m, be substantially free of particles exceeding 20 $\mu$m in particle size, and have a specific surface area of not more than 20 m$^2$/g. Outside or above these ranges or limits, the transparency tends to become poor and, in particular, the improvement with respect to film whitening on stretching, which is an important feature of the invention, would no longer be produced.

The amount of the silicon oxide to be added to synthetic resins may vary depending on the desired infrared absorption level of the film to be produced. Generally, however, it is preferably added in an amount of about 2 to about 25% by weight, more preferably about 5 to about 15% by weight, based on the synthetic resin. If said amount is below 2% by weight, the infrared absorptivity improving effect is hardly observable in the films obtained whereas the amount exceeding 25% by weight is undesirable because of the resulting decrease in film strength.

In the practice of the invention, the silicon oxide powder is admixed with a synthetic resin by a conventional method, for example by mixing or kneading them in a roll-type or Banbury type mixer or in an extruder and then the mixture is molded into films by an appropriate molding method known in the art for the base synthetic resin, for example by inflation, calendering, or T-die extrusion. Generally, the film manufacture can suitably be conducted at a processing temperature of 130° C. to 250° C.

For admixing the silicon oxide with the synthetic resin, there may be employed a so-called masterbatching technique, which comprises preparing a high silicon oxide content master batch in advance by mixing or kneading the silicon oxide with the same synthetic resin as the base resin in the same manner as mentioned above and then, in the step of film manufacture, blending the master batch with the base synthetic resin to adjust the silicon oxide content to a predetermined addition level, followed by film molding.

The synthetic resin film containing silicone oxide according to the invention can be used as such for various applications. Alternatively, when a transparent synthetic resin layer may be laminated onto at least one surface of a film made of such silicon oxide-containing synthetic resin, the resulting film can have further improved transparency.

The transparent synthetic resin layer to be used for lamination is composed of the foregoing olefin resins. The resin for forming the synthetic resin layer should preferably be of the same type as the resin constituting the silicon oxide-containing synthetic resin film as much as possible. For applications that require higher transparency, it is preferable to use a three-layer film prepared by laminating a transparent synthetic resin layer onto both surfaces of a silicon oxide-containing synthetic resin film. The lamination may be carried out by using any appropriate technique known in the art, for example by dry lamination, heat lamination, extrusion lamination, or multilayer coextrusion for laminated film production. The extrusion lamination method and multilayer coextrusion method are particularly preferred from the viewpoint of ease of molding, interlaminar bonding in product films, transparency and cost, among others. The multilayer coextrusion inflation method is also desirable since broad films are preferred in agricultural applications.

The thickness of such silicon oxide-containing synthetic resin films and of the transparent laminating resin layer (hereinafter referred to as laminating film) to be laminated onto at least one surface of said films should be determined depending on the intended final use and desired improvement (transparency, infrared absorptivity). As regards the silicon oxide-containing synthetic resin films, a thickness of about 20 to about 300 μm, particularly about 20 μm to about 200 μm is generally sufficient, although the thickness may very depending on the base synthetic resin and the silicon oxide addition level. As for the laminating film, a thickness of about 5 to about 100 μm, particularly about 10 μm to about 50 μm is generally sufficient.

The films obtained in the above manner may contain a dispersing agent, such as a sorbitan fatty acid ester (e.g. sorbitan monostearate) or a glycerol fatty acid ester (e.g. glycerol monostearate), in an amount of 0.2 to 2 parts by weight per 100 parts by weight of the silicon oxide-containing film for further improving the dispersion of the silicon oxide effectively. The films may also contain an appropriate stabilizer, ultraviolet absorber, and/or antistatic agent and, furthermore, a waterdrop formation inhibitor and so on, if so required, each in an appropriate amount.

The films obtained in accordance with the invention are excellent in transparency and infrared absorbing property and, in particular, can avoid that whitening phenomenon upon stretching which is characteristic of inorganic compound-containing films. Therefore, they are very useful, for instance as food packaging materials and as covering materials for agricultural and particularly protected horticultural houses and the like.

EXAMPLES

The following reference examples (examples of silicon oxide powder production) and examples are further illustrative of the present invention. It is to be noted, however, that they are given merely for illustration purposes and are by no means limitative of the scope of the invention.

FIG. 1 is a graphic representation of the phenomenon of whitening on stretching for each of the various films obtained in some of the Examples and Comparative Examples. In the figure, the percent increment in haze value (ΔHAZE) relative to the haze value of the film before stretching (ordinate) is plotted against the elongation of the film (abscissa).

The transparency, whitening-on-stretching and infrared absorptivity data shown in the examples and comparative examples were obtained by the following measurement methods.

Transparency (1) Total light transmitance and haze: The measurement was performed in accordance with JIS K-6714 using a haze meter produced by Nippon Seimitsu Kogaku Kabushiki Kaisha.

(2) Visual transparency (NAS): The degree of seethrough was determined by small-angle scattering using a visual transparency tester produced by Toyo Seiki Kabushiki Kaisha.

Whitening on stretching

The haze of the test film specimen (40 mm wide, 70 mm long) stretched to a predetermined elongation at a rate of pulling of 200 mm/min was determined using a haze meter (product of Nippon Seimitsu Kogaku). The percent elongation at which whitening (indicated by "Haze value after stretching—initial haze value=10%") first took place was used as an index of whitening on stretching.

Infrared absorptivity

The infrared absorptivity of each test film was determined using the following definition of absorbed radiation energy and the measurement method therefor mentioned below.

Suppose the absorbance of the test specimen to be $A_{\lambda \cdot T}$ at an absolute temperature of 300°K, the radiation energy absorbed by the specimen $E_{\lambda \cdot T}$ can be calculated, within the wavelength range of 2.5 to 30.3 μm, as follows:

$$E_{A \cdot T} = \int_{2.5}^{30.3} A_{\lambda \cdot T} \cdot J_{\lambda \cdot T} \cdot d\lambda (W/cm^2 \cdot deg.)(\text{solid angle})$$

where $J_{\lambda \cdot T}$ is the intensity distribution of black body radiation according to Planck's law, namely $$J_{\lambda \cdot T} = \frac{C_1}{\lambda^5} (e^{\frac{C_2}{\lambda \cdot T}} - 1)^{-1}$$

where $C_1 = 3.7402 \times 10^{-12}$ (W/cm²)
$C_2 = 1.43848$ (cm·deg.) (solid angle)
$\lambda$ = wavelength (cm)
T = temperature, 300°K The absorbance $A_{\lambda \cdot T}$ of the specimen can be calculated from the infrared absorption spectrum data obtained by infrared spectrophotometry at the absolute temperature 300° K, as follows:

$$A_{\lambda \cdot T} = 1 - J_\lambda / J_{o\lambda}$$

where $J_{o\lambda}$ is the incident light intensity and $J_\lambda$ is the transmitted light intensity.

The radiation energy absorbed was calculated by integration in the wavelength interval of 2.5 to 30.3 μm at 0.02-μm subintervals.

The infrared absorption spectrum of each film was measured by a conventional method using a infrared spectrophotometer (product of Nippon Bunko).

For the above-mentioned transparency and infrared absorptivity measurements, films highly precise in thickness were prepared and subjected to measurements.

Reference Example 1

Production of silicon oxide powder

A natural silica rock (lump of about 100 mm size was washed with water and roughly ground in a hammer mill. The roughly ground silica was charged into a ball mill together with water and milled for about 70 hours causing friction among silica grains. The resultant silica slurry was divided equally into three portions, which were then transferred respectively to three precipitation tanks and subjected to sedimentation classification. The silica slurries were taken out after 100, 50, and 20 hours of sedimentation treatment, then dehydrated, dried with hot air at a temperature of 250° C., and subjected to classification to a desired particle size using a conventional powder separator (Trademark "Power Micron Separator", product of Hosokawa Micron). The silicon oxide powders thus obtained after 100, 50, and 20 hours of sedimentation are hereinafter referred to as silicon oxide A, B and C, respectively.

Separately, the same silica rock as used above was washed with water and roughly ground in a hammer mill. The ground silica was charged into a grinding machine of the hammer mill type and, after further dry mechanical grinding, the resultant powder was dried with hot air at a temperature of 250° C. and then subjected to classification to a desired particle size using the above powder separator to give silicon oxide D.

The powder characteristics of the thus-obtained silicon oxide species as determined were as shown in Table 1. The particle size was determined by the Coulter counter method, and the specific surface area was determined by the BET method.

TABLE 1

| Method of grinding | Silicon oxide | | | |
|---|---|---|---|---|
| | A | B | C | D |
| | Underwater grinding | | | Dry mechanical grinding |
| $SiO_2$ content (%) | 99 | 99 | 99 | 99 |
| Average particle size (μm) | 1.3 | 3.8 | 4.3 | 2.6 |
| Content (%) of particles >10 μm | 0 | 1.6 | 4.5 | 0.5 |
| Content (%) of particles >20 μm | 0 | 0 | 1.1 | 0 |
| Specific surface area (m$^2$/g) | 11 | 10 | 9 | 10 |

EXAMPLE 1

An ethylene-vinyl acetate copolymer with a vinyl acetate content of 15% by weight (Evatate® H 2021, product of Sumitomo Chemical Co.; MFR=2 g/10 min) was kneaded with 8% by weight of silicon oxide A and 0.8% by weight of glycerol monostearate (dispersing agent) in a 5-liter Banbury mixer at a resin temperature of 130°-150° C. for 10 minutes, and the resultant mixture was granulated into pellets using an extruder. This composition is hereinafter referred to as silicon oxide-containing resin composition.

The above silicon oxide-containing resin composition was fed to a multilayer inflation apparatus equipped with a two-component three-layer inflation die (150 mm in bore) through an extruder (40 mm in bore) at a melting zone temperature of 180° C. and a die temperature of 190° C. and at a discharge rate of 9 kg/hr for interlayer formation. For outer and inner layer formation, an ethylene-vinyl acetate copolymer with a vinyl acetate content of 5% by weight (Evatate® D 2021, product of Sumitomo Chemical Co.; MFR=2 g/10 min) was fed to the outer and inner layers of said die at a melting zone temperature of 180° C. and a die temperature of 190° C. and at a discharge rate of 4.2 kg/hr. The three resin layers fed to the three layers of the die were combined within said die and the resultant tubular body having a three-layer sandwich structure was taken off from the die at a blow-up ratio of 2.4, a frost line distance of 200 mm and a take-off speed of 4.9 m/min to give a film having a three-layer sandwich structure consisting of a 0.013-mm-thick inner layer, a 0.05-mm-thick interlayer and a 0.013-mm-thick outer layer. The flattened tube width was 365 mm. Typical characteristics of the thus-obtained film, namely transparency (total light transmission, haze and NAS), whitening on stretching, infrared absorptivity and formation of hard spots due to silicon oxide aggregation, are summarized in Table 3.

EXAMPLE 2

Low-density polyethylene (Sumikathene® F 401, product of Sumitomo Chemical Co.; density=0.925 g/cm$^3$, MFR=3.8 g/10 min) was kneaded with 40% by weight of silicon oxide A and 1.5% by weight of glycerol monostearate (dispersing agent) in a 5-liter Banbury mixer at a resin temperature of 150°-170° C. for 10 minutes and the resultant mixture was pelletized using an extruder. This mixture is hereinafter referred to as masterbatch A.

A 76-μm-thick three-layer film was produced in the same manner as in Example 1 except that mixed pellets composed of 80% by weight of low-density polyethylene (Sumikathene® F 208-1, product of Sumitomo Chemical Co.; density 0.924 g/cm$^3$, MFR 1.5 g/10 min) and 20% by weight of the above masterbatch A was fed to the two-component three-layer inflation die (150 mm in bore) of the multilayer inflation apparatus through an extruder (40 mm in bore) under the same conditions as in Example 1 for interlayer formation and that, for outer and inner layer formation, L-LDPE (Sumikathene® L FA201, product of Sumitomo Chemical Co.; density=0.920 g/cm$^3$, MFR=2.1 g/10 min) was fed to said die at a melting zone temperature of 190° C. and a die temperature of 190° C. and at a discharge rate of 4.2 kg/hr. Typical characteristics of the film obtained are summarized in Table 3.

EXAMPLE 3

A silicon oxide-containing resin composition for interlayer formation was prepared in the same manner as in Example 1 except that the amount of silicon oxide A in the resin composition used as the interlayer in Example 1 was raised to 12% by weight. The composition was then subjected to three-layer film molding in the same manner as in Example 1 to give a 76-μm-thick film. Typical characteristics of the film are summarized in Table 3.

EXAMPLE 4

A 76-μm-thick three-layer film was produced by repeating the procedure of Example 1 in the same manner except that silicon oxide B was used in lieu of silicon oxide A. Typical characteristics of the film are summarized in Table 3.

EXAMPLE 5

In a Henschel mixer, a plasticized transparent polyvinyl chloride composition composed of 100 parts by weight of polyvinyl chloride (Sumilite® SX-11, product of Sumitomo Chemical Co.), 37 parts by weight of dioctyl phthalate, 3 parts by weight of tricresyl phosphate, 3 parts by weight of a barium- and zinc-containing composite stabilizer and 0.5 part by weight of a phosphite ester chelator was mixed with 5% by weight of silicon oxide B, and the mixture was melted and kneaded in a 5-liter Banbury mixer and molded into a 75-μm-thick film on a four-8-inch roll inverted L calender. Typical characteristics of the film are summarized in Table 3.

COMPARATIVE EXAMPLE 1 TO 4

The procedure of Example 1 was repeated in the same manner except that the silicon oxide species specified below in Table 2 were each used in lieu of silicon oxide A used in Example 1. Typical characteristics of the thus-obtained 76-μm-thick films are summarized in Table 4.

COMPARATIVE EXAMPLE 5

A 76-μm-thick film was produced by repeating the procedure of Example 1 in the same manner except that no silicon oxide was added. Typical characteristics of the film are summarized in Table 4.

COMPARATIVE EXAMPLE 6

A 75-μm-thick film was produced by repeating the procedure of Example 5 in the same manner except that silicon oxide D was used in lieu of silicon oxide B. Typical characteristics of the film are summarized in Table 4.

TABLE 2

| | Comparative Example 1 | Comparative Example 2 | Comparative Example 3 | Comparative Example 4 |
|---|---|---|---|---|
| | | Silicon oxide | | |
| | Silicon oxide C (natural product) | Silicon oxide D (natural product) | Nipsil VN-3 (Note 1) (synthetic product) | Durosil (Note 2) (synthetic product) |
| Method of grinding | Underwater | Mechanical | Mechanical | Mechanical |
| $SiO_2$ content (%) | 99 | 99 | 94 | 98 |
| Average particle size (μm) | 4.3 | 2.6 | 0.02 | 0.04 |
| Content (%) of particles >10 μm | 4.5 | 0.5 | 0 | 0 |
| Content (%) of particles >20 μm | 1.1 | 0 | 0 | 0 |
| Specific surface area ($m^2/g$) | 9 | 10 | 240 | 62 |

Note 1: Silicon oxide produced by Nippon Silica Industrial Co.
Note 2: Silicon oxide produced by Degussa (Germany)

TABLE 3

| | Film construction | | | | | | | | | |
|---|---|---|---|---|---|---|---|---|---|---|
| | Silicon oxide-containing resin layer, 50 μm thick | | | | | | | | | Outer and inner layers 13 μm thick Resin |
| | Base resin | Name | Method of grinding | $SiO_2$ content (%) | Average particle size (μm) | Content of particles >10 μm (%) | Content of particles >20 μm (%) | Specific surface area ($m^2/g$) | Addition level (%) | |
| Example 1 | EVA | Silicon oxide A | Underwater | 99 | 1.3 | 0 | 0 | 11 | 8 | EVA |
| Example 2 | LDPE | Silicon oxide A | Underwater | 99 | 1.3 | 0 | 0 | 11 | Masterbatch method 8 | L-LDPE |
| Example 3 | EVA | Silicon oxide A | Underwater | 99 | 1.3 | 0 | 0 | 11 | 12 | EVA |
| Example 4 | " | Silicon oxide B | Underwater | 99 | 3.8 | 1.6 | 0 | 10 | 8 | " |
| Example 5 | PVC | Silicon oxide B | Underwater | 99 | 3.8 | 1.6 | 0 | 10 | 5 | Single layer film 75 μm thick |

| | Film characteristics | | | | | |
|---|---|---|---|---|---|---|
| | Transparency | | | Whitening on stretching | Infrared absorbing ability | Formation of hard spots |
| | Total light trasmitance (%) | Haze (%) | NAS (%) | % Film elongation at which ΔHAZE amounts to +10% | Radiation energy absorbed ($W/cm^2 \cdot deg$) | Hard spots due to silicon oxide aggregates |
| Example 1 | 91.0 | 13.6 | 16.8 | 370 | 12100 | No |
| Example 2 | 90.6 | 14.1 | 17.0 | 370 | 8200 | " |
| Example 3 | 90.8 | 17.3 | 18.2 | 350 | 13500 | " |
| Example 4 | 90.6 | 24.0 | 28.3 | 240 | 12100 | " |
| Example 5 | 88.0 | 18.8 | 23.1 | >200 | 14500 | " |

EVA: Ethylene-vinyl acetate copolymer
LDPE: Low-density polyethylene
L-LDPE: Linear low-density polyethylene
PVC: Polyvinyl chloride (plasticized)

TABLE 4

Film construction

TABLE 4-continued

| | Silicon oxide-containing resin layer, 50 μm thick | | | | | | | | Outer and inner layers 13 μm thick Resin |
|---|---|---|---|---|---|---|---|---|---|
| | Base resin | Name | Method of grinding | SiO₂ content (%) | Average particle size (μm) | Content of particles >10 μm (%) | Content of particles >20 μm (%) | Specific surface area (m²/g) | Addition level (%) | |
| Comp. Ex. 1 | EVA | Silicon oxide C | Underwater | 99 | 4.3 | 4.5 | 1.1 | 9 | 8 | EVA |
| Comp. Ex. 2 | " | Silicon oxide D | Mechanical | 99 | 2.6 | 0.5 | 0 | 10 | 8 | " |
| Comp. Ex. 3 | " | Nipsil VN-3 | Mechanical | 94 | 0.02 | 0 | 0 | 240 | 8 | " |
| Comp. Ex. 4 | " | Durosil | Mechanical | 98 | 0.04 | 0 | 0 | 62 | 8 | " |
| Comp. Ex. 5 | " | — | — | — | — | — | — | — | — | " |
| Comp. Ex. 6 | PVC | Silicon oxide D | Mechanical | 99 | 2.6 | 0.5 | 0 | 10 | 5 | Single layer film 75 μm thick |

| | Film characteristics | | | | | |
|---|---|---|---|---|---|---|
| | Transparency | | | Whitening on stretching | Infrared absorbing ability | Formation of hard spots |
| | Total light transmitance (%) | Haze (%) | NAS (%) | % Film elongation at which ΔHAZE amounts to +10% | Radiation energy absorbed (W/cm² · deg) | Hard spots due to silicon oxide aggregates |
| Comp. Ex. 1 | 90.0 | 28.8 | 34.3 | 115 | 12100 | No |
| Comp. Ex. 2 | 90.5 | 30.5 | 38.4 | 65 | 12200 | " |
| Comp. Ex. 3 | 90.5 | 6.8 | 16.5 | 50 | 11900 | Frequent |
| Comp. Ex. 4 | 90.0 | 10.9 | 21.4 | 45 | 11600 | " |
| Comp. Ex. 5 | 91.0 | 6.0 | 10.2 | >500 | 7000 | — |
| Comp. Ex. 6 | 87.5 | 3.5 | 7.0 | 60 | 14600 | — |

EVA: Ethylene-vinyl acetate copolymer
LDPE: Low-density polyethylene
L-LDPE: Linear low-density polyethylene
PVC: Polyvinyl chloride (plasticized)

As is evident from the above examples and comparative examples, films of the invention, namely synthetic resin films containing silicon oxide produced by underwater grinding and having the specific powder characteristics, have good transparency and, in particular, show a much reduced tendency toward whitening upon stretching and furthermore have high infrared absorptivity. Thus they are very suited for use as packaging films and as films for agricultural use.

On the other hand, synthetic resin films containing silicon oxide powders prepared by dry method or silicon oxide powders failing to meet the specified powder characteristics requirements, whether natural or synthetic, indeed have infrared absorbing ability owing to the incorporation of silicon oxide but have insufficient transparency. Furthermore, they allow formation of hard spots. Thus they are not suited for use as packing materials or films for agricultural use. The phenomenon of whitening on stretching occurs in them already at a small elongation, making them less practical.

We claim:

1. An infrared absorbing transparent film comprising a synthetic resin containing silicon oxide particles in an amount of about 2 to 25% by weight based on the synthetic resin, and wherein the silicon oxide particles are produced by underwater grinding, and have an average particle size of not more than 4 μm and a specific surface area of not more than 20 m²/g, said film being substantially free of silicon oxide particles exceeding 20 μm.

2. An infrared absorbing film as claimed in claim 1 wherein the silicon oxide particles are produced by underwater grinding, and have an average particle size of not more than 3 μm and a specific surface area of not more than 15 m²/g, said film being substantially free of silicon oxide particles exceeding 10 μm.

3. An infrared absorbing film as claimed in claim 1 which has a thickness of about 20 to about 300 μm.

4. An infrared absorbing film as claimed in claim 1 wherein the synthetic resin is an olefin resin.

5. An infrared absorbing film as claimed in claim 1 wherein the synthetic resin is an olefin resin having a melt flow rate of about 0.1 to about 4 g/10 min.

6. An infrared absorbing film as claimed in claim 1 wherein the synthetic resin is low density polyethylene or an ethylene-α-olefin copolymer each having a density of 0.935 g/cm³ or less.

7. An infrared absorbing film as claimed in claim 1 wherein the synthetic resin is an ethylene-vinyl acetate copolymer.

8. An infrared absorbing film as claimed in claim 1 wherein the synthetic resin is a polyvinyl chloride resin.

9. An infrared absorbing film as claimed in claim 1 which further comprises a transparent synthetic resin layer formed over at least one surface of the infrared absorbing transparent film comprising the synthetic resin and silicon oxide particles.

10. An infrared absorbing film as claimed in claim 9 wherein the transparent synthetic resin layer is composed of a synthetic resin which is the same as the synthetic resin constituting the film containing silicon oxide particles.

11. An infrared absorbing film as claimed in claim 9 wherein the synthetic resin is an olefin resin.

12. An infrared absorbing film as claimed in claim 9 wherein the synthetic resin is an olefin resin having a melt flow rate of about 0.1 to about 4 g/10 min.

13. An infrared absorbing film as claimed in claim 9 wherein the synthetic resin is low density polyethylene or an ethylene-α-olefin copolymer each having a density of 0.935 g/cm$^3$ or less.

14. An infrared absorbing film as claimed in claim 9 wherein the synthetic resin is an ethylene-vinyl acetate copolymer.

15. An infrared absorbing film as claimed in claim 9 wherein the synthetic resin is a polyvinyl chloride resin.

16. An infrared absorbing film as claimed in claim 9 wherein the transparent synthetic resin layer is over both surfaces of the film comprising the synthetic resin and silicon oxide particles.

17. An infrared absorbing film as claimed in claim 9 wherein the transparent resin layer has a thickness of about 5 to about 100 μm.

18. An infrared absorbing film as claimed in claim 1 wherein the synthetic resin is a low-density polyethylene, a medium-density polyethylene or a high density polyethylene.

19. An infrared absorbing film as claimed in claim 1 wherein the synthetic resin is a copolymer of ethylene and butene-1, 4-methylpentene, hexene-1, octene-1, acrylic acid, alkyl (meth)acrylate or propylene.

20. An infrared absorbing film as claimed in claim 1 wherein the synthetic resin is an ionomer resin or a propylenebutene-1 copolymer.

21. An infrared absorbing film as claimed in claim 1 wherein the synthetic resin is a plasticized polyvinyl chloride resin.

22. An infrared absorbing film as claimed in claim 1 wherein the synthetic further comprises a dispersing agent, a stabilizer, an ultraviolet absorber, an antistatic agent, a waterdrop formation inhibitor or a mixture thereof.

* * * * *